United States Patent
Applegate et al.

(10) Patent No.: US 6,321,336 B1
(45) Date of Patent: Nov. 20, 2001

(54) SYSTEM AND METHOD FOR REDIRECTING NETWORK TRAFFIC TO PROVIDE SECURE COMMUNICATION

(75) Inventors: John Applegate, Andover; Jeff Romatoski, Woodbury, both of MN (US)

(73) Assignee: Secure Computing Corporation, Roseville, MN (US)

( * ) Notice: Subject to any disclaimer, the term of this patent is extended or adjusted under 35 U.S.C. 154(b) by 0 days.

(21) Appl. No.: 09/042,293

(22) Filed: Mar. 13, 1998

(51) Int. Cl.[7] .................................................. G06F 11/00
(52) U.S. Cl. ..................... 713/201; 713/152; 713/153; 709/229; 709/220
(58) Field of Search .................................. 713/200, 201, 713/150–153, 154, 162, 152; 709/227, 229, 226; 370/401, 392

(56) References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner | 364/200 |
| 4,701,840 | 10/1987 | Boebert et al. | 364/200 |
| 4,713,753 | 12/1987 | Boebert et al. | 364/200 |
| 4,870,571 | 9/1989 | Frink | 364/200 |
| 4,885,789 | 12/1989 | Burger et al. | 380/25 |
| 4,914,568 | 4/1990 | Kodosky et al. | 364/200 |
| 5,077,658 * | 12/1991 | Bendert et al. | 395/600 |
| 5,093,914 | 3/1992 | Coplien et al. | 395/700 |
| 5,124,984 | 6/1992 | Engel | 370/94.1 |
| 5,153,918 | 10/1992 | Tuai | 380/25 |
| 5,204,961 | 4/1993 | Barlow | 395/725 |
| 5,228,083 | 7/1993 | Lozowick et al. | 380/9 |
| 5,263,147 | 11/1993 | Francisco et al. | 395/425 |
| 5,272,754 | 12/1993 | Boebert | 380/25 |
| 5,276,735 | 1/1994 | Boebert et al. | 380/21 |
| 5,303,303 | 4/1994 | White | 380/49 |
| 5,305,385 | 4/1994 | Schanning et al. | 380/49 |
| 5,311,593 | 5/1994 | Carmi | 380/23 |

(List continued on next page.)

FOREIGN PATENT DOCUMENTS

| | | | |
|---|---|---|---|
| 0 554 182 A1 | 4/1993 | (EP) | H04L/29/06 |
| 0 743 777 A2 | 11/1996 | (EP) | H04L/29/06 |
| 2287619 A | 9/1995 | (GB) | H04L/12/22 |
| 97/29413 | 8/1997 | (WO) . | |
| 96/35994 | 11/1996 | (WO) | G06F/13/14 |

(List continued on next page.)

OTHER PUBLICATIONS

Boebert, W.E., et al., "Secure Ada Target: Issues, System Design, and Verification", *Proceedings of the Symposium on Security and Privacy*, Oakland, California, pp. 59–66, (1985).

(List continued on next page.)

*Primary Examiner*—Ario Etienne
*Assistant Examiner*—Firmin Backer
(74) *Attorney, Agent, or Firm*—Schwegman, Lundberg, Woessner & Kluth, P.A.

(57) ABSTRACT

A communication security system is described which uses a server to communicate to an unprotected network, such as the Internet. The system intercepts an IP packet prior to stack incursion and replaces the destination address with that of a firewall's network interface address. Because of the modification to the IP header destination address, an IP header checksum is recalculated prior to presentation to the local stack. The system uses a shim to replace the destination address and store the original destination address. When a communication is authorized, the firewall performs a system call to retrieve the original destination address such that the data communication can be routed to the indented destination address.

20 Claims, 4 Drawing Sheets

U.S. PATENT DOCUMENTS

| | | |
|---|---|---|
| 5,329,623 | 7/1994 | Smith et al. ............ 395/275 |
| 5,333,266 | 7/1994 | Boaz et al. ............ 395/200 |
| 5,355,474 | 10/1994 | Thuraisngham et al. ............ 395/600 |
| 5,414,833 | 5/1995 | Hershey et al. ............ 395/575 |
| 5,416,842 | 5/1995 | Aziz ............ 380/30 |
| 5,455,828 | 10/1995 | Zisapel ............ 370/85.3 |
| 5,485,460 | 1/1996 | Schrier et al. ............ 370/94.1 |
| 5,511,122 | 4/1996 | Atkinson ............ 380/25 |
| 5,548,646 | 8/1996 | Aziz et al. ............ 380/23 |
| 5,550,984 | 8/1996 | Gelb ............ 395/200.17 |
| 5,566,170 | 10/1996 | Bakke et al. ............ 370/60 |
| 5,583,940 | 12/1996 | Vidrascu et al. ............ 380/49 |
| 5,586,260 | 12/1996 | Hu ............ 395/200.2 |
| 5,604,490 | 2/1997 | Blakley, III et al. ............ 340/825.31 |
| 5,606,668 | 2/1997 | Shwed ............ 395/200.11 |
| 5,615,340 | 3/1997 | Dai et al. ............ 395/200.17 |
| 5,619,648 | 4/1997 | Canale et al. ............ 395/200.01 |
| 5,623,601 | * 4/1997 | Vu ............ 395/187.01 |
| 5,636,371 | 6/1997 | Yu ............ 395/500 |
| 5,644,571 | 7/1997 | Seaman ............ 370/401 |
| 5,671,279 | 9/1997 | Elgamal ............ 380/23 |
| 5,673,322 | 9/1997 | Pepe et al. ............ 380/49 |
| 5,684,951 | 11/1997 | Goldman et al. ............ 395/188.01 |
| 5,689,566 | 11/1997 | Nguyen ............ 380/25 |
| 5,699,513 | * 12/1997 | Feigen et al. ............ 395/187.01 |
| 5,706,507 | 1/1998 | Schloss ............ 395/615 |
| 5,708,780 | 1/1998 | Levergood et al. ............ 395/200.12 |
| 5,828,833 | * 10/1998 | Belville ............ 395/187.01 |
| 5,828,893 | * 10/1998 | Weid et al. ............ 395/800 |
| 5,864,683 | * 1/1999 | Boebert et al. ............ 395/200 |
| 5,896,499 | * 4/1999 | Mckeley ............ 395/187.01 |
| 5,898,830 | * 4/1999 | Wesinger, Jr. et al. ............ 395/187.01 |
| 5,950,195 | * 9/1999 | Stockwell ............ 707/4 |
| 5,958,016 | * 9/1999 | Chang et al. ............ 709/229 |
| 5,968,176 | * 10/1999 | Nesset et al. ............ 713/201 |

FOREIGN PATENT DOCUMENTS

| | | | |
|---|---|---|---|
| 96/13113 | 5/1996 | (WO) ............ | H04L/29/06 |
| 97/13340 | 4/1997 | (WO) ............ | H04L/9/00 |
| 97/26731 | 7/1997 | (WO) ............ | H04L/9/00 |
| 97/26734 | 7/1997 | (WO) ............ | H04L/9/00 |
| 97/26735 | 7/1997 | (WO) ............ | H04L/9/00 |

OTHER PUBLICATIONS

Boebert, W.E., et al., "Secure Computing: The Secure Ada Target Approach", *Sci. Honeyweller, 6(2)*, 17 pages, (1985).

International Search Report, PCT Application No. PCT/US 95/12681, 8 p. (mailed Apr. 9, 1996).

News Release: "100% of Hackers Failed to Break Into One Internet Site Protected by Sidewinder™", Secure Computing Corporation (Feb. 16, 1995).

News Release: "Internet Security System Given 'Product of the Year' Award", Secure Computing Corporation (Mar. 28, 1995).

News Release: "SATAN No Threat to Sidewinder™", Secure Computing Corporation (Apr. 26, 1995).

"Answers to Frequently Asked Questions About Network Security", *Secure Computing Corporation*, p. 1–41 & p. 1–16 (Sep. 25, 1994).

"Sidewinder Internals", Product information, Secure Computing Corporation, 16 p. (Oct. 1994).

"Special Report: Secure Computing Corporation and Network Security", *Computer Select*, 13 p. (Dec. 1995).

Adam, J.A., "Meta–Matrices", *IEEE Spectrum*, p. 26 (Oct. 1992).

Adam, J.A., "Playing on the Net", *IEEE Spectrum*, p. 29 (Oct. 1992).

Ancilotti, P., et al., "Language Features for Access Control", *IEEE Transactions on Software Engineering, SE–9*, 16–25 (Jan. 1983).

Badger, L., et al., "Practical Domain and Type Enforcement for UNIX", *Proceedings of the 1995 IEEE Symposium on Security and Privacy*, p. 66–77 (May 1995).

Belkin, N.J., et al., "Information Filtering and Information Retrieval: Two Sides of the Same Coin?", *Communications of the ACM, 35*, 29–38 (Dec. 1992).

Bellovin, S.M., et al., "Network Firewalls", *IEEE Communications Magazine, 32*, 50–57 (Sep. 1994).

Bevier, W.R., et al., "Connection Policies and Controlled Interference", *Proceedings of the Eighth IEEE Computer Security Foundations Workshop*, Kenmare, Ireland, p. 167–176 (Jun. 13–15, 1995).

Bowen, T.F., et al., "The Datacycle Architecture", *Communications of the ACM, 35*, 71–81 (Dec. 1992).

Bryan, J., "Firewalls For Sale", *BYTE*, 99–100, 102, 104–105 (Apr. 1995).

Cobb, S., "Establishing Firewall Policy", *IEEE*, 198–205 (1996).

Damashek, M., "Gauging Similarity with n–Grams: Language–Independent Categorization of Text", *Science, 267*, 843–848 (Feb. 10, 1995).

Dillaway, B.B., et al., "A Practical Design For A Multilevel Secure Database Management System", *American Institute of Aeronautics and Astronautics, Inc.*, p. 44–57 (Dec. 1986).

Fine, T., et al., "Assuring Distributed Trusted Mach", *Proceedings of the IEEE Computer Society Symposium on Research in Security and Privacy*, p. 206–218 (1993).

Foltz, P.W., et al., "Personalized Information Delivery: An Analysis of Information Filtering Methods", *Communications of the ACM, 35*, 51–60 (Dec. 1992).

Gassman, B., "Internet Security, and Firewalls Protection on the Internet", *IEEE*, 93–107 (1996).

Goldberg, D., et al., "Using Collaborative Filtering to Weave an Information Tapestry", *Communications of the ACM, 35*, 61–70 (Dec. 1992).

Grampp, F.T., "UNIX Operating System Security", *AT&T Bell Laboratories Technical Journal, 63*, 1649–1672 (Oct. 1984).

Greenwald, M., et al., "Designing an Academic Firewall: Policy, Practice, and Experience with Surf", *IEEE*, 79–92 (1996).

Haigh, J.T., et al., "Extending the Noninterference Version of MLS for SAT", *Proceedings of the 1986 IEEE Symposium on Security and Privacy*, Oakland, CA, p. 232–239 (Apr. 7–9, 1986).

Karn, P., et al., "The ESP DES–CBC Transform", Network Working Group, Request for Comment No. 1829, http//ds.internic.net/rfc/rfc1829.txt, 9 p. (Aug. 1995).

Kent, S.T., "Internet Privacy Enhanced Mail", *Communications of the ACM, 36*, 48–60 (Aug. 1993).

Lampson, B.W., et al., "Dynamic Protection Structures", *AFIPS Conference Proceedings, 35*, 1969 Fall Joint Computer Conference, Las Vegas, NV, 27–38 (Nov. 18–20, 1969).

Lee, K.C., et al., "A Framework for Controlling Cooperative Agents", *Computer*, 8–16 (Jul. 1993).

Lodin, S.W., et al., "Firewalls Fend Off Invasions from the Net", *IEEE Spectrum*, 26–34 (Feb. 1998).

Loeb, S., "Architecting Personalized Delivery of Multimedia Information", *Communications of the ACM, 35*, 39–48 (1992).

Loeb, S., et al., "Information Filtering", *Communications of the ACM, 35*, 26–28 (Dec. 1992).

McCarthy, S.P., "Hey Hackers! Secure Computing Says You Can't Break into This Telnet Site", *Computer Select*, 2 p. (Dec. 1995).

Merenbloom, P., "Network 'Fire Walls' Safeguard LAN Data from Outside Intrusion", *Infoworld*, p. 69 & addnl. page (Jul. 25, 1994).

Metzger, P., et al., "IP Authentication using Keyed MD5", Network Working Group, Request for Comments No. 1828, httP//ds.internic.net/rfc/rfc1828.txt, 5 p. (Aug. 1995).

Obraczka, K., et al., "Internet Resource Discovery Services", *Computer*, 8–22 (Sep. 1993).

Peterson, L.L., et al., In: *Computer Networks*, Morgan Kaufmann Publishers, Inc., San Francisco, CA, p. 218–221, 284–286 (1996).

Press, L., "The Net: Progress and Opportunity", *Communications of the ACM, 35*, 21–25 (Dec. 1992).

Schroeder, M.D., et al., "A Hardware Architecture for Implementing Protection Rings", *Communications of the ACM, 15*, 157–170 (Mar. 1972).

Schwartz, M.F., "Internet Resource Discovery at the University of Colorado", *Computer*, 25–35 (Sep. 1993).

Smith, R.E., "Constructing a High Assurance Mail Guard", Secure Computing Corporation (Appeared in the Proceedings of the National Computer Security Conference), 7 p. (1994).

Smith, R.E., "Sidewinder: Defense in Depth Using Type Enforcement", *International Journal of Network Management*, p. 219–229 (Jul.–Aug. 1995).

Stadnyk, I., et al., "Modeling User's Interests in Information Filters", *Communications of the ACM, 35*, 49–50 (Dec. 1992).

Stempel, S., "IpAccess—An Internet Service Access System for Firewall Installations", *IEEE*, 31–41 (1995).

Stevens, C., "Automating the Creation of Information Filters", *Communications of the ACM, 35*, 48 (Dec. 1992).

Thomsen, D., "Type Enforcement: The New Security Model", *SPIE, 2617*, 143–150 (1995).

Warrier, U.S., et al., "A Platform for Heterogeneous Interconnection Network Management", *IEEE Journal on Selected Areas in Communications, 8*, 119–126 (Jan. 1990).

White, L.J., et al., "A Firewall Concept for Both Control-Flow and Data–Flow in Regression Integration Testing", *IEEE*, 262–271 (1992).

Wolfe, A., "Honeywell Builds Hardware for Computer Security", *Electronics*, 14–15 (Sep. 2, 1985).

\* cited by examiner

SYSTEM AND METHOD FOR REDIRECTING NETWORK TRAFFIC TO PROVIDE SECURE COMMUNICATION

TECHNICAL FIELD OF THE INVENTION

The present invention pertains generally to network communications, and in particular to a system and method for regulating the flow of inter-network connections through a firewall.

BACKGROUND OF THE INVENTION

Firewalls have become an increasingly important part of network design. Firewalls provide protection of valuable resources on a private network while allowing communication and access with systems located on an unprotected network such as the Internet. In addition, they operate to block attacks on a private network arriving from the unprotected network by providing a single connection with limited services. A well designed firewall limits the security problems of an Internet connection to a single firewall computer system. This allows an organization to focus their network security efforts on the definition of the security policy enforced by the firewall. An example of a firewall is given in "SYSTEM AND METHOD FOR PROVIDING SECURE INTERNETWORK SERVICES", U.S. patent application Ser. No. 08/322,078, filed Oct. 12, 1994, by Boebert et al., the description of which is hereby incorporated by reference. A second example of such a system is described in "SYSTEM AND METHOD FOR ACHIEVING NETWORK SEPARATION", U.S. application Ser. No. 08/599,232, filed Feb. 9, 1996, by Gooderum et al., the description of which is hereby incorporated by reference. Both are examples of application level gateways. Finally, "SECURITY POLICY MANAGEMENT SYSTEM AND METHOD", U.S. application Ser. No. 08/715,668, filed Sep. 18, 1996, by Stockwell et al. describes a system and method for regulating the flow of internetwork connections through a firewall, the description of which is hereby incorporated by reference. Application level gateways use proxies operating at the application layer to process traffic through the firewall. As such, they can review not only the message traffic, but also message content. In addition, they provide authentication and identification services, access control and auditing.

Application level gateways operate best on hardened operating systems. For example, the Sidewinder® product, built by the assignee of the present invention, is an application level gateway which operates on a hardened version of BSD Unix.

The advantage of having an application level gateway operate on top of a hardened operating system is that the routing of traffic through the gateway can be restricted to require that all traffic through the gateway pass through the application level proxy first.

To date, in order to harden the operating system, the programmer has required access to the operating system source code. In many instances, however, operating system manufactures are hesitant to give outside parties access to their source code. What is needed is a way of modifying an existing operating system so that it can be used as a firewall implementing an application level gateway without access to operating system source code.

For the reasons stated above, and for other reasons stated below which will become apparent to those skilled in the art upon reading and understanding the present specification, there is a need in the art for a system which provides a firewall that can be used with an indigenous stack without modification.

SUMMARY OF THE INVENTION

The above-mentioned problems with providing a secure network without access to operating system source code and other problems are addressed by the present invention and which will be understood by reading and studying the following specification. A system is described which reroutes data packets without requiring modification of the source code of a commercial operating system.

In particular, the present invention describes a method of securing communication between an external network and a processor operating on an internal network. The method comprising the steps of receiving a communication from an internal network host. The communication including a first destination address. The method includes creating a session control block and storing therein the first destination address, replacing the first destination address with a second destination address identifying a location of a communication security firewall, and routing the communication to the security firewall through a stack after the first destination address is replaced with the second destination address. A security check is performed to determine if the communication is authorized. The session control block is accessed to retrieve the first destination address, and the second destination address is replaced with the first destination address if the communication is authorized. If authorized, the communication is routed to the processor operating on the external network. Finally, communication from an external host directed at the security firewall is associated to the internal network host.

In another embodiment, a method is described for securing communication between an external network and a processor operating on an internal network. The method comprising the steps of receiving a communication from the external network, including a first destination address, and a first header check sum. The method further includes using a shim located between a stack and a network interface adapter to identify an appropriate session control block, identifying an IP address of an internal host using the identified session control block, routing the communication to the security firewall through a TCP/IP stack, and performing a security check of the communication to determine if the communication is authorized. Finally, if the communication is authorized, the communication is routed to the processor operating on the internal network.

In yet another embodiment of the invention, a firewall for securing traffic between an internal and an external network comprises a network interface, a network driver connected to the network interface, and an application level proxy. A protocol stack is connected to the application level proxy. A shim is connected between the protocol stack and the network interface adapter. The shim includes means for modifying an address of network traffic to redirect the traffic up the protocol stack to the application level proxy.

DETAILED DESCRIPTION OF THE INVENTION

Figure 1:
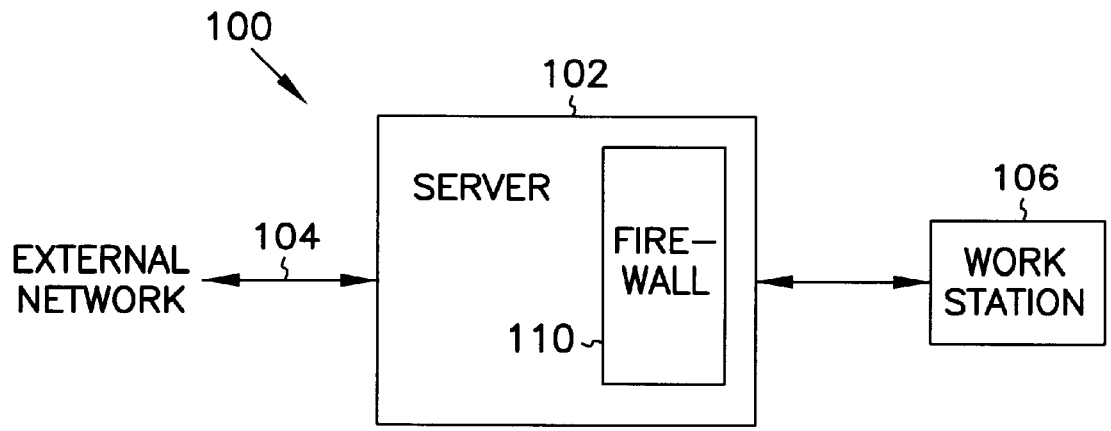
FIG. 1 is a block diagram of a processing system of the present invention.

In the following detailed description of the preferred embodiment, references made to the accompanying drawings which form a part hereof, and in which is shown, by way of illustration, specific preferred embodiments in which the invention may be practiced. These embodiments are described in sufficient detail to enable those skilled in the art to practice the invention, and it is to be understood that other embodiments may be utilized and that structural, logical, physical, architectural, and electrical changes, may be made without departing from the spirit and scope of the present invention. The following detailed description is, therefore, not to be taken in a limiting sense, and the scope of the present invention is defined only by the appended claims and their equivalents.

Some systems use Access Control Lists, or ACLs, to control traffic through a firewall. An ACL is a list of rules that regulate the flow of Internet connections through a firewall. These rules control how a firewall's servers and proxies will react to connection attempts. When a server or proxy receives an incoming connection, it performs an ACL check on that connection. ACL checks can be performed utilizing various criteria including source and destination IP addresses. An ACL check compares the source and destination IP address of the connection against a list of ACL rules. The rules determine whether the connection is allowed or denied. A rule can also have one or more side effects. A side effect causes the proxy to change its behavior in some fashion. For example, a common side effect is to redirect the destination IP address to an alternate machine. In general, a connection from a specific IP source address to a specific IP destination address is denied unless there is a rule that allows the connection and there is no entry that denies the connection based upon some non-IP based attribute of the connection.

In one embodiment of the present invention, a processing system 100 of the present invention uses a server 102, such as a Microsoft Windows™ NT Server, to communicate to an unprotected external network 104 such as the Internet. System 100 can include a workstation 106 communicating through a firewall 110 to the unprotected network. In one embodiment, the firewall 110 is an application level gateway operating to process traffic. As such, it can review not only the message traffic but also message content. In addition, it provides authentication and identification services, access control and auditing. The firewall application provides protocol level filtration and indigenous Transmission Control Protocol/Internet Protocol (TCP/IP) stack protection without modification of the TCP/IP stack.

Firewall architectures are often called upon to use an indigenous stack without modification. This is the case with the NT Firewall construction where a firewall design is forced to utilize the Microsoft™ TCP/IP stack or create an expensive custom protocol stack within NT. One difficulty in this system is the requirement to trick, or "spoof", the local stack to accept Internet Protocol (IP) packets that are not destined for the firewall. To solve this problem, in one embodiment, the IP packet is intercepted prior to stack incursion and the destination address is replaced with that of the firewall's network interface address, as explained in detail below. Because of the modification to the IP header (destination address), an IP header checksum is recalculated prior to presentation to the local stack. Further, since the IP header destination address is modified, the TCP header checksum is also recalculated. The checksum modification is described in detail below.

Firewall Architecture

The following is an overview of computer communication protocols and an illustration of the flow of data through the Firewall. Details are then provided on specific parts of the Firewall architecture, such as the NDIS Shim.

Figure 2:
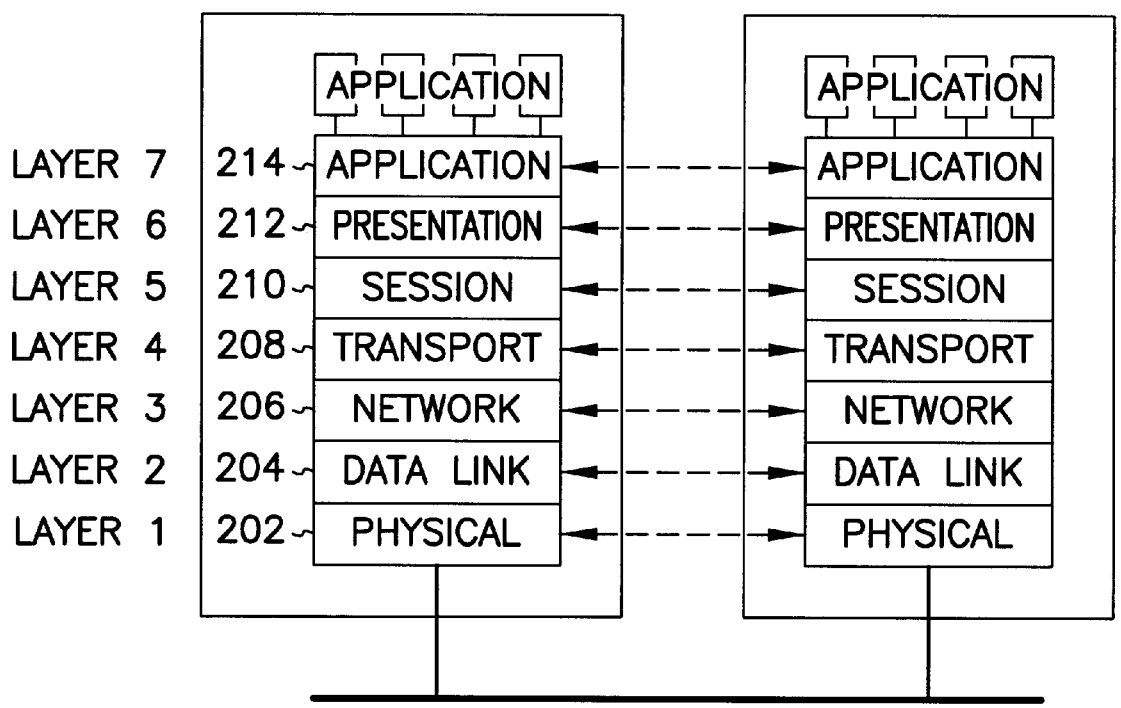
FIG. 2 is a block diagram of an OSI system.

The Open Section Interconnection (OSI) reference model is a useful framework for discussing the relationships between the various software components that enable computers to communicate over networks. The OSI model comprises seven protocol layers: physical 202, data link 204, network 206, transport 208, session 210, presentation 212 and application(s) 214, see FIG. 2.

Figure 3:
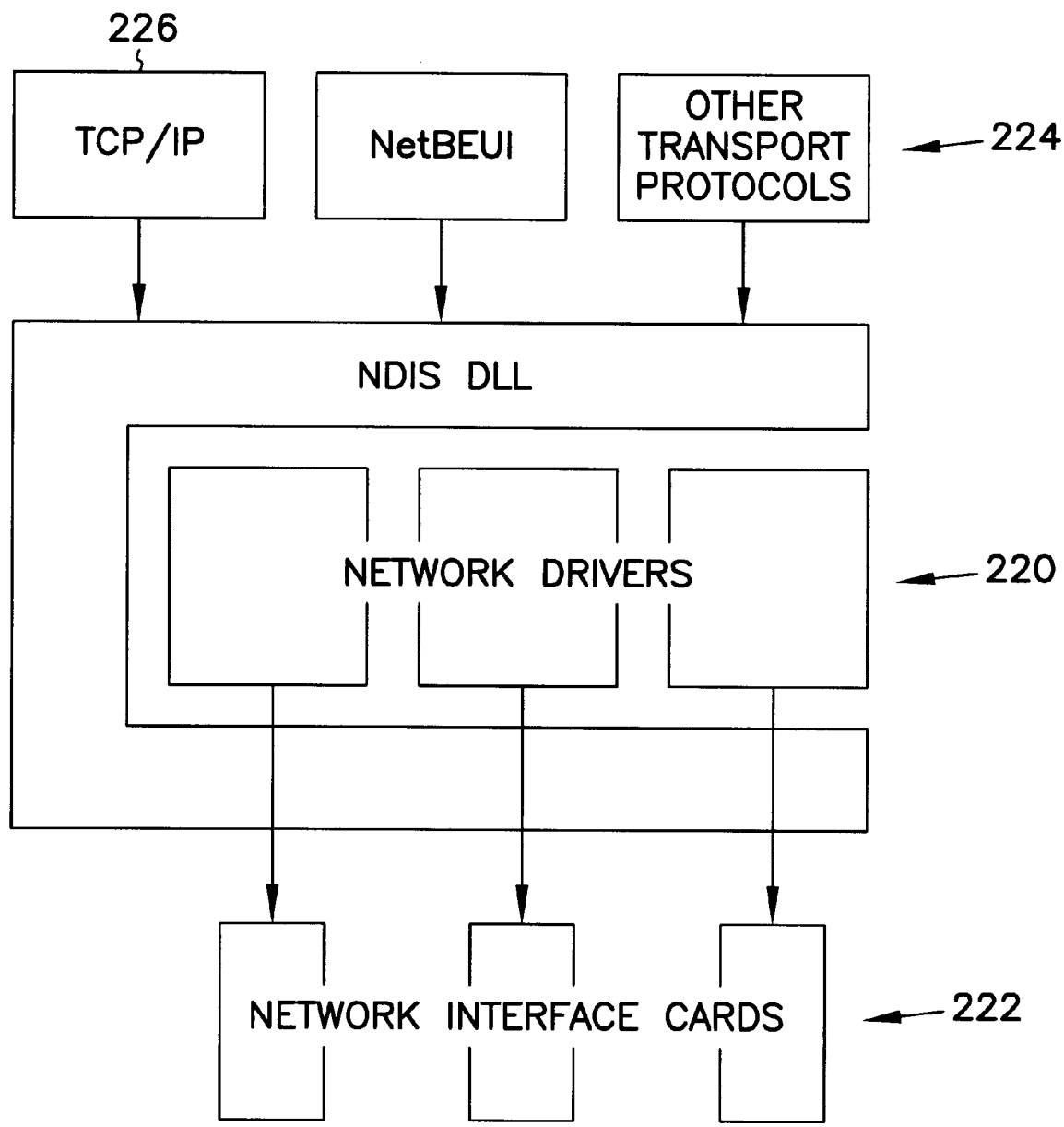
FIG. 3 is a diagram of a network interface adapter of the present invention.

The Network Driver Interface Specification (NDIS) is a Windows NT interface, protocol and environment. Its primary purpose is to provide a common interface so that network drivers 220 can work with a variety of network cards 222, transport protocols and operating systems. The operational context for NDIS is shown in FIG. 3. NDIS is used to provide services to various transport protocols 224 that sit above it. The NDIS protocol, therefore maps to the physical 202 and data link layers 204. The NDIS is known to those skilled in the art, and is detailed in Microsoft Windows NT Device Driver Kit, see also "Windows NT Network Programming" Ralph Davis (1994) for a more detailed understanding of Windows NT systems.

TCP/IP (Transmission Control Protocol/Internet Protocol) 226 is commonly mapped to the network 206 and transport 208 OSI layers. The mapping, however, may vary depending on specific vendor implementations. The primary responsibility of the IP layer of the protocol is to assure that message packets are received error-free and in the order sent. TCP provides a greater level of transmission reliability than other transport protocols, such as User Datagram Protocol (UDP).

The firewall provides security protection between an internal computer network and an external network such as the Internet. It provides security by filtering out unacceptable protocols originating from the external network. It also prevents the two end points of a dialog from directly exchanging messages, and hides the identities of internal computers from the external network via a technique referred to as network address hiding. Finally, attempted security breaches and suspicious network activity are logged.

Figure 4:
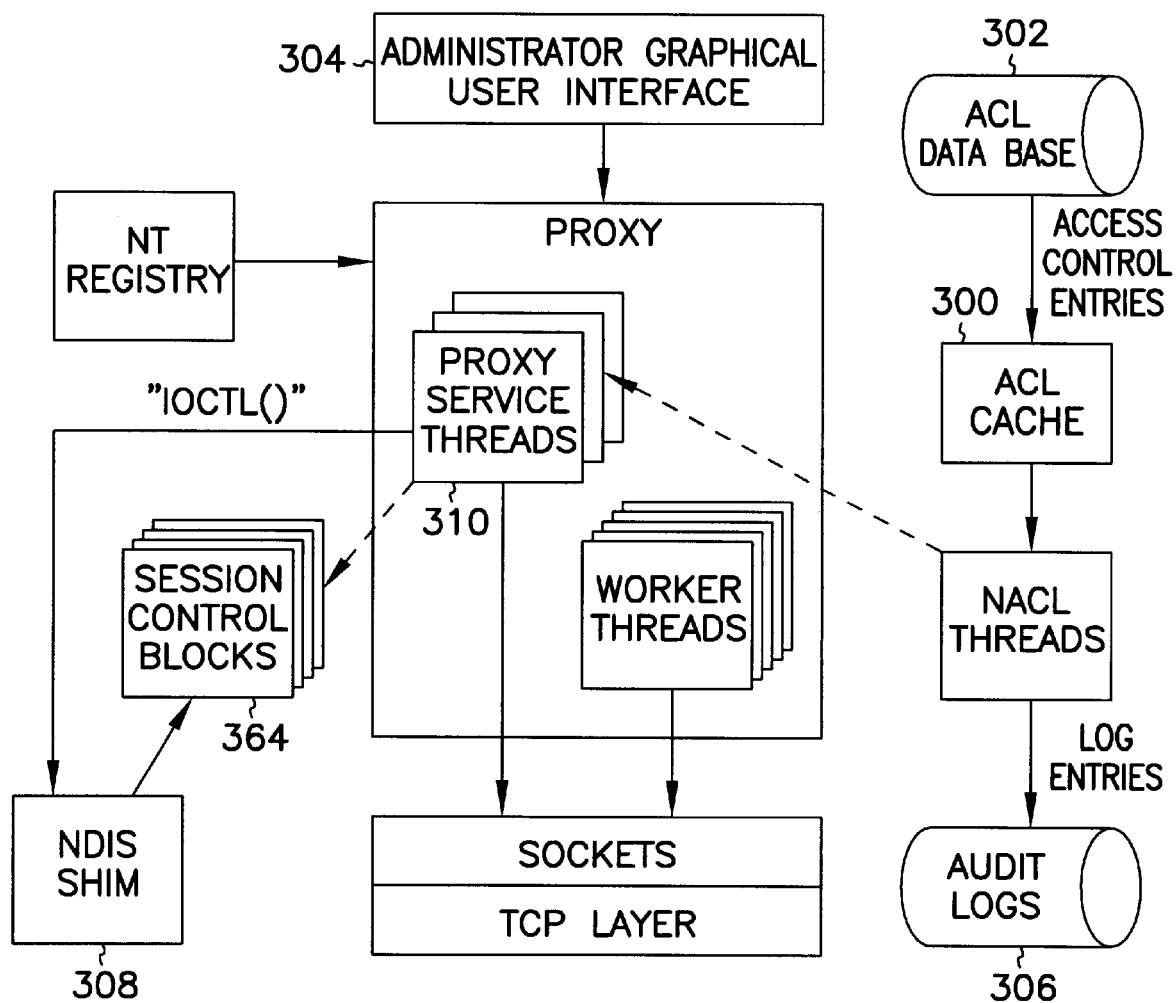
FIG. 4 is a block diagram of a firewall of the present invention.

The major components of the firewall are ACL cache 300, ACL database 302, graphical interface 304, audit logs 306, NDIS shim 308, and proxy 310, see FIG. 4. The ACL cache 300 maintains frequently-accessed access control entries in volatile memory to reduce data base searches and improve throughput. The ACL database 302 contains the access control entries referenced by a proxy. The graphical interface 304 provides a user interface for managing the firewall and controlling network security. The audit logs 306 use an NT event log for system logging, security logging and application logging. The NDIS shim 308 filters out unacceptable protocols and spoofs the IP layer into accepting and forwarding message packets to the proxy. A proxy 310 performs access checks on messages and transfers approved messages between the internal and external network interfaces. There is a proxy service for each kind of network service, such as FTP or Telnet.

Figure 5:
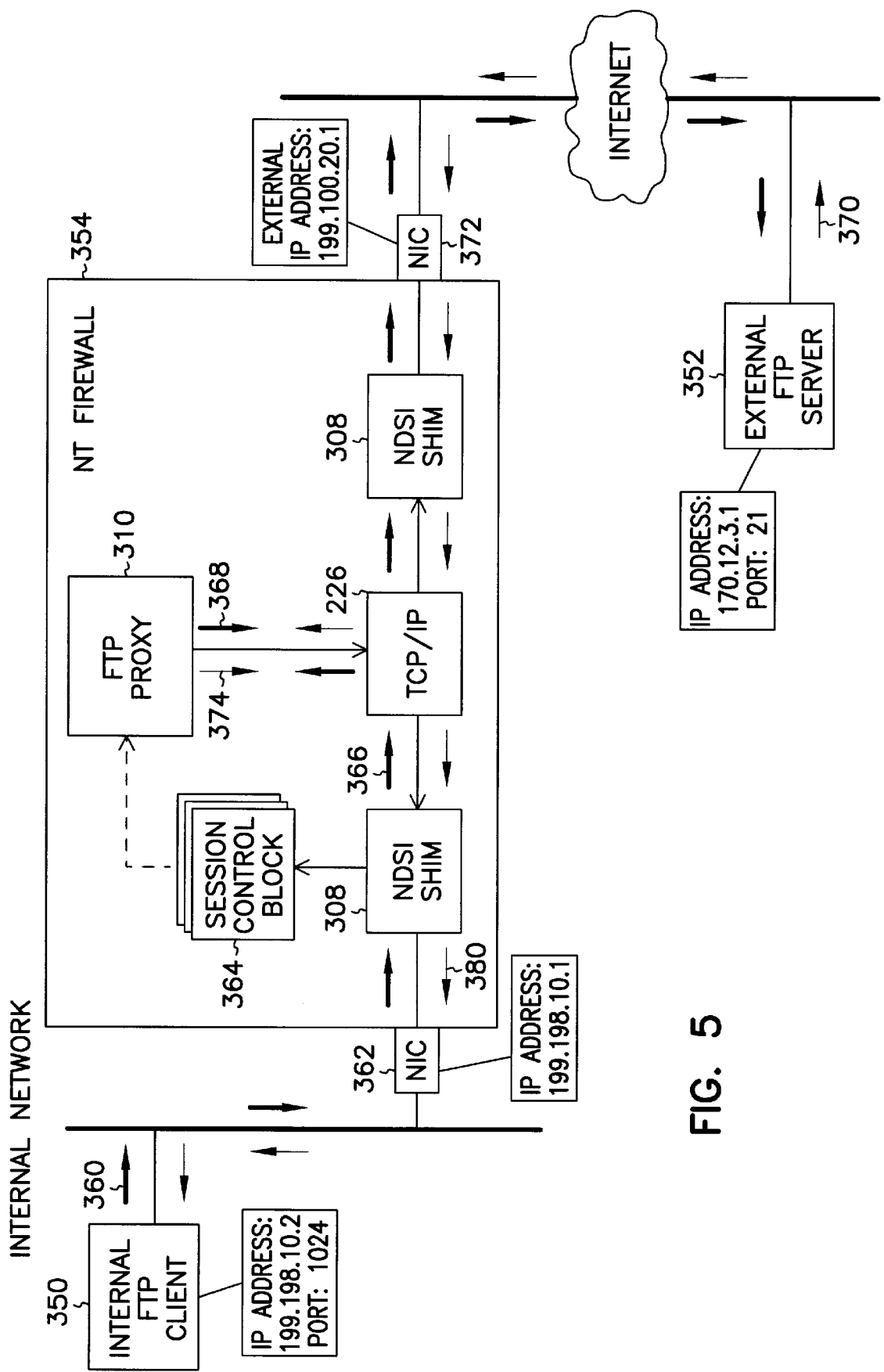
FIG. 5 is a block diagram of a processing system of the present invention illustrating data communication operation.

To illustrate the basic operation of the firewall, referring to FIG. 5, assume that a client machine, or work station, 350 on the internal network (IP address 199.198.10.2) requests FTP services of a server machine 352 on the Internet (IP address 170.12.3.1). The FTP client specifies the firewall 354 as its default gateway. The firewall is installed and is operational on a computer that is connected to both the internal and external networks. The firewall allows the FTP service connection used in this example and therefore, starts an FTP proxy. In one embodiment, firewall 354 will determine if a service such as FTP services is allowed at start up. If so, an FTP proxy will be started and will be listening for TCP open-connection requests before the client makes its request. For simplicity, only the FTP proxy listening on port 21 is described.

The FTP software on the client machine issues a service request to the FTP server at IP address 170.12.3.1 and port 21, which is the FTP well-known port number. The client's TCP/IP protocol stack handles the request by assembling a message packet and passing it to the lower-level protocols. The lower-level protocols in turn interface with the network card on the client system to place the packet on the network 360. The IP and TCP headers in the packet contain many fields of information, but only the following are relevant to the invention: source IP address 199.198.10.2, source port 1024, destination IP address 170.12.3.1, and destination port 21. The message packet is picked up by the NIC adapter 362 at IP address 199.198.10.1, where it is examined by the shim 308. The shim is located between the stack and a network interface adapter. The shim could take the form of an IP Wrapper in UNIX, or NDIS shim in Microsoft™. The NDIS Shim determines that this is an acceptable protocol and decides that the message can be passed along for further processing by the Firewall. Before passing along the message, the NDIS Shim creates a new Session Control Block (SCB) 364 containing the IP addresses and ports. The NDIS shim also replaces the destination IP address with the internal IP address of the Firewall (199.198.10.1) to force the IP layer of the firewall to accept a message that is actually meant for an IP address on the external network. The Checksum fields for both the TCP and IP headers are also recalculated.

The message packet is then passed along 366 to TCP/IP 226. The modified message packet has: source IP address 199.198.10.2, source port 1024, destination IP address 199.198.10.1, and destination port 21. The IP layer then examines the IP header, determines that the message is destined for the Firewall machine and accepts it. TCP/IP passes the message along to the FTP proxy, which is listening for incoming messages. The FTP proxy 310 obtains the message, verifies that the FTP connection is permitted by an access control entry, and hides the internal source of the message from the external network.

The FTP proxy requests the Session Control Block 364 corresponding to the pending connection from the NDIS Shim. The Session Control Block contains, among other things, the actual destination address which is needed to get the message to the external FTP server. (Keep in mind that the destination address was previously changed to the address of the Firewall itself.) The proxy then performs an ACL query to determine if the connection between the source and destination is allowed at this time. If the connection is permitted, the proxy must hide the internal source of the message. To do this, the FTP proxy modifies the IP and TCP headers to: source IP address 199.100.20.1, source port 1028, destination IP address 170.12.3.1, and destination port 21, at 368. Note the source IP address is changed to the firewall's external address. Thus, all packets appear to have originated on the external side of the firewall, thereby hiding all internal addresses. The FTP proxy also replaces the destination IP address with the actual destination address originally requested by the FTP client, so that the packet will go to the correct Internet site.

The FTP proxy passes the message back to TCP/IP 226, which passes it to the NDIS Shim 308. The NDIS Shim passes the message on to the external NIC adapter, which places it on the external network. The FTP server machine receives the message and replies 370 with a message which contains the header fields: source IP address 170.12.3.1, source port 21, destination IP address 199.100.20.1, and destination port 1028. Note that the reply address is to the firewall's external address, since that's where the server thinks the message originated. The reply packet arrives at the firewall's external NIC adapter 372, which passes it to the NDIS Shim. The NDIS Shim in turn passes it to TCP/IP which gives the reply packet to the FTP proxy, which is still listening for activity on the port.

The FTP proxy associates the reply connection from the external FTP server with the connection between the Firewall and the internal client. The FTP proxy create s the appropriate IP headers, at 374, so that the reply can be routed back to the client on the internal network: source IP address 199.198.10.1, source port 21, destination IP address 199.198.10.2, and destination port 1024. Note that the destination address is now the address of the internal client system.

The FTP proxy then gives the reply packet to TCP/IP, which passes it along to the NDIS Shim. The NDIS Shim specifies the Source IP address to be the address of the external FTP server as defined in the session control block. The packet now at 380 contains header information: source IP address 170.12.3.1, source port 21, destination IP address 199.198.10.2, and destination port 1024. The source address is now the address of the Internet FTP server. The NDIS Shim finally gives the packet to the internal NIC adapter, which places it on the internal network. The client then receives the reply.

NDIS Shim

The NDIS Shim 308 is a software component of the firewall with two primary functions: filter out unwanted protocols and unwanted packets within protocols, and modify accepted packet headers, so that the IP layer is "spoofed" into passing the packets upward to the proxy. In support of this, the NDIS Shim provides an system call IOCTL-like function that the proxy can call to obtain the original contents of the fields in the spoofed message packet headers. Besides containing logic to implement the above functions, the NDIS Shim also provides a Virtual Shim Adapter that emulates a network adapter interface at its upper edge, and a transport protocol interface to the real adapters at its lower edge.

The NDIS Shim also supports the network administrator by detecting and logging events to the audit logs. The logged events may be viewed from the administrator's graphical user interface 304. The NDIS Shim is responsible for filtering out unwanted protocols at both the internal and the external network interfaces.

The NDIS Shim performs a form of internal packet routing by tricking the IP layer into passing acceptable packets upward to the Service Proxies. The shim, therefore, saves the original destination IP address, the source IP address, the destination port number and the source port number in a new session control block. As stated above, this session control block is needed to store the original destination IP address for the proxy. The shim replaces the original destination IP address in the IP header with the IP address of the internal network interface. Without replacing the IP address and header, the transport layer (referred to herein as the stack) would reject the datagram because the destination IP address would not match the transport layer's IP address. The shim also recalculates the checksum fields in the IP and TCP headers, as described in more detail below, to prevent the datagram from being rejected for failing the transport layer's data validation check.

The NDIS Shim provides an IOCTL-like function so that the proxy can retrieve the original destination IP address from the session control blocks. Since there is no guarantee that an allocated session control block will be claimed, the NDIS Shim applies a timeout interval to the allocated blocks. For example, a session control block won't be claimed if a proxy server has not been configured and enabled. If a session a control block's timer expires, the NDIS Shim discards the block and logs the incident to the event log.

The NDIS Shim is responsible for logging certain events to the event log. The audit criteria are fixed and obtained when the NDIS Shim is booted. The types of log entries can be: denied connection requests, ICMP redirect commands from the external network, and timed-out session control blocks.

Checksum Modification

As is well-known to one skilled in the art, a network system such as OSI incorporate a number of protocol layers. In most embodiments, packets to be transferred between networks are formed as a sequence of packet encapsulations as the message moves through the protocol stack. The base packet, at the physical layer contains the network layer packet, which in turn contains the transport layer packet. At each level of encapsulation a checksum is performed on the encapsulated material and the packet header.

Internet Protocol (IP), which exists at the network layer (OSI model), allows for packet segmentation in order to accommodate various network topologies. Because of this TCP header checksum, calculations and verifications must normally wait until all of the IP segments have been received. The invention circumvents the need to wait for all of the IP segments to be collected prior to relating the packet stream, with the recalculated TCP and IP fragments to the local stack. The result is a dramatic increase in throughput.

The TCP header checksum is recalculated for the first segment in a packet after the destination address has been substituted to spoof the TCP/IP. The TCP header checksum is calculated by taking the difference of the destination IP addresses and subtracting this from the TCP header checksum. Using this technique there is no need to have the entire packet available to calculate the checksum. This is an important feature when packet segmentation is considered, and results in a more efficient communication.

Within the art, normally the TCP/IP stack is modified to some degree in order to accommodate firewall functionality. With the methodology of the present invention, a vendor's TCP/IP stack can be used without modification, and access to the source code is not required. The present system, therefore, is distinguishable from systems that modify a third party's vendor stack in order to provide functionality. The present methodology has the added benefit of being sufficiently flexible that the firewall designer may incorporate specific filtration to defend the native stack against susceptibilities which are known at the time of the design.

Conclusion

A system has been described which uses a server to communicate to an unprotected external network, such as the Internet. The system intercepts a packet prior to stack incursion and replaces the destination address with that of a firewall's network interface address. Because of the modification to the packet destination address, a header checksum is recalculated prior to presentation to the local stack. The system uses a shim to replace the destination address and store the original destination address. When a communication is authorized, the firewall performs an IOCT-like system call to retrieve the original destination address such that the data communication can be routed to the indented destination address.

The firewall provides security protection between an internal computer network and an external network, such as the Internet. Security is provided by filtering out unacceptable protocols originating from the external network, and preventing the two end points of a dialog from directly exchanging messages. The firewall hides the identity of internal computers from the external network, and logs attempted security breaches and suspicious network activity.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. In particular, the use of the above shim technology can be extended to any network which uses a protocol stack to provide a common interface between network drivers and an operating system. Therefore, it is manifestly intended that this invention be limited only by the claims and the equivalents thereof.

What is claimed is:

1. A method of securing communication between an external network and a processor operating on an internal network, the method comprising the steps of:

receiving a communication from an internal network host, the communication including a first destination address;

creating a session control block and storing therein the first destination address;

replacing the first destination address with a second destination address identifying a location of a communication security firewall;

routing the communication to the security firewall through a stack after the first destination address is replaced with the second destination address;

performing a security check to determine if the communication is authorized;

accessing the session control block to retrieve the first destination address;

replacing the second destination address with the first destination address if the communication is authorized;

if authorized, routing the communication to the processor operating on the external network; and associating communication from an external host directed at the security firewall to the internal network host.

2. The method of claim 1 wherein the step of creating a session control block includes storing an external host destination address.

3. The method of claim 2 wherein the step of creating a session control block includes storing a destination address and port number and a source address and port number.

4. The method of claim 1 wherein the step of replacing the first destination address includes the step of replacing a check sum included in the communication after the step of replacing the first destination address.

5. The method of claim 1 wherein the step of replacing the first destination address is performed in a shim prior to routing the communication via the security firewall.

6. The method of claim 1 wherein the firewall includes an access control list of rules that regulate flow of communications through the firewall and wherein the step of performing a security check includes the step of accessing a rule as a function of the first destination address.

7. A method of securing communication between an external network and a processor operating on an internal network, the method comprising the steps of:
receiving a communication from the external network, the communication including a first destination address, and a first header check sum;
using a shim located between a stack and a network interface adapter to identify an appropriate session control block;
identifying an IP address of an internal host using the identified session control block;
routing the communication to the security firewall through a TCP/IP stack;
performing a security check of the communication to determine if the communication is authorized; and
if the communication is authorized, routing the communication to the processor operating on the internal network.

8. The method of claim 7 wherein the step of routing includes the steps of;
replacing the second destination address with the first destination address; and
replacing a second header check sum with the first header check sum.

9. A data communication system comprising:
at least one internal work station coupled to an internal network; and
a processor coupled to the internal network and an external network for controlling communications therebetween, wherein the processor includes an address modifier to replace a first internal destination address included in an externally received data communication with a second destination address identifying a location of a communication security firewall, and store the first destination address for later retrieval.

10. The data communication system of claim 9 wherein the processor includes a network driver and a network driver interface, and wherein the address modifier includes a network interface adapter used to capture the externally received data communication.

11. The data communication system of claim 9 wherein the processor stores the first destination address in a session control block which can be accessed by the security firewall using a system call.

12. The data communication system of claim 9 wherein the processor recalculates and substitutes a header check sum which is included in the externally received data communication.

13. A network interface computer coupled to first and second networks, the network interface computer comprising:
a processor for controlling data communication between the first and second networks, the processor is operable to receive a communication from the second network including a first destination address of a work station on the second network, replace the first destination address with a second destination address identifying a location of a communication security firewall operating on the processor, and route the communication to the security firewall where it can be determined if the communication is authorized, the processor is further operable to replace the second destination address with the first destination address if the communication is authorized, and route the communication to an internal receiver on the network.

14. The network interface computer of claim 13 wherein the processor is operable to store the first destination address for later retrieval by the security firewall using a system call.

15. The network interface computer of claim 13 wherein the processor routes the communication to the security firewall through a TCP/IP stack after the first destination address is replaced with the second destination address.

16. The network interface computer of claim 13 wherein the processor is operable to recalculate and replace a header check sum included in the communication after the first destination address is replaced.

17. Computer-readable medium having computer-executable instructions to a cause a computer connected to an internal and an external network to perform steps comprising:
receiving a communication from an external source via the external network, the communication includes both a header specifying a first destination address of an internal receiver on the internal network, and a header check sum;
using a network interface adapter, replacing the first destination address with a second destination address specifying a location of a communication security firewall;
storing the first destination address for later retrieval;
routing the communication to the security firewall through a TCP/IP stack;
performing a security check of the communication to determine if the communication is authorized;
replacing the second destination address with the first destination address if the communication is authorized;
replacing the header check sum after the first destination address is replaced; and
routing the communication to the internal receiver on the network.

18. A firewall for securing traffic between an internal and an external network, comprising:
a network interface;
a network driver connected to the network interface;
an application level proxy;
a protocol stack connected to the application level proxy; and
a network driver interface, connected to the protocol stack and the network driver, wherein the network driver interface includes means for modifying an address of network traffic to redirect the traffic up the protocol stack to the application level proxy.

19. The firewall of claim 18 wherein the network driver interface includes means for modifying a header check sum of network traffic redirected up the protocol stack to the application level proxy.

20. The firewall of claim 19 wherein the network driver interface includes means for storing an unmodified address and header check sum of network traffic.

* * * * *